United States Patent

Thomas et al.

[11] Patent Number: 5,936,682
[45] Date of Patent: Aug. 10, 1999

[54] CIRCUIT FOR ENHANCING CHROMINANCE TRANSITIONS IN REAL-TIME VIDEO RECEPTION

[75] Inventors: Joseph Thomas; Viviana D'Alto, both of Milan; Massimo Mancuso, Monza, all of Italy

[73] Assignee: STMicroelectronics S.r.l., Agrate Brianza, Italy

[21] Appl. No.: 08/889,691

[22] Filed: Jul. 7, 1997

[30] Foreign Application Priority Data

Jul. 9, 1996 [EP] European Pat. Off. ............ 96830387

[51] Int. Cl.[6] .................. H04N 5/208; H04N 5/21; H04N 5/213
[52] U.S. Cl. .................. 348/625; 348/627; 348/631; 348/607; 348/252; 382/266; 382/263; 358/447
[58] Field of Search .................. 348/625, 627, 348/631, 607, 713, 909, 910, 252, 645, 646, 606, 630, 609; 382/162, 260, 275, 254, 266, 263; 358/518, 532, 447; H04N 5/208, 5/21, 5/213

[56] References Cited

U.S. PATENT DOCUMENTS

| | | | |
|---|---|---|---|
| 4,918,528 | 4/1990 | Oohashi | 348/625 |
| 5,304,854 | 4/1994 | Aoki et al. | 327/170 |
| 5,373,326 | 12/1994 | Nojima et al. | 348/624 |
| 5,414,473 | 5/1995 | Hong | 348/625 |
| 5,457,546 | 10/1995 | Hong | 358/447 |
| 5,469,225 | 11/1995 | Hong | 348/625 |
| 5,515,112 | 5/1996 | Penney | 348/630 |
| 5,668,606 | 9/1997 | Okamoto et al. | 348/625 |
| 5,699,126 | 12/1997 | Hong | 348/625 |
| 5,715,335 | 2/1998 | Haan et al. | 382/265 |
| 5,774,599 | 6/1998 | Muka et al. | 382/254 |
| 5,777,689 | 7/1998 | Dunbar | 348/625 |
| 5,825,937 | 10/1998 | Ohuchi et al. | 382/261 |
| 5,825,938 | 10/1998 | De Lange | 382/263 |
| 5,847,774 | 12/1998 | Cho | 348/625 |

FOREIGN PATENT DOCUMENTS

| | | | |
|---|---|---|---|
| 0514196 A2 | 11/1992 | European Pat. Off. | |
| 6 205244 | 7/1992 | Japan | H04N 5/208 |
| 4334172 | 11/1992 | Japan . | |
| 5 183777 | 7/1993 | Japan | H04N 5/208 |
| 6 46294 | 2/1994 | Japan | H04N 5/208 |
| 6 78179 | 3/1994 | Japan | H04N 5/208 |
| 08098058 | 4/1996 | Japan | H04N 5/208 |
| 08307733 | 11/1996 | Japan | H04N 5/208 |
| 2 262 856 | 6/1993 | United Kingdom | H04N 5/208 |
| 2 273 843 | 6/1994 | United Kingdom | H04N 5/208 |

*Primary Examiner*—John K. Peng
*Assistant Examiner*—Jean W. Désir
*Attorney, Agent, or Firm*—Seed and Berry LLP; David V. Carlson; Kevin S. Ross

[57] ABSTRACT

A circuit for enhancing chrominance transitions in a received chrominance video signal comprises a linear-phase digital filter supplied with an input stream of discrete chromatic image elements. The filter also has a high-pass transfer characteristic in a region of the frequency spectrum corresponding to an upper limit of a transmitted chrominance signal bandwidth for enhancing high-frequency components of the received chrominance signal. The circuit additionally includes non-linear digital post-processing circuitry which accepts as input an output of the filter and the input stream of discrete chromatic image elements. The non-linear post-processing circuitry acts on the output of the filter to eliminate distortions introduced in the received chrominance signal by the filter. The post-processing circuitry then detects if the received chrominance signal contains a transition pattern corresponding to predetermined patterns. If the chrominance signal matches one of the predetermined patterns, the filter is bypassed and the output of the circuit is equal to the received chrominance signal.

26 Claims, 4 Drawing Sheets

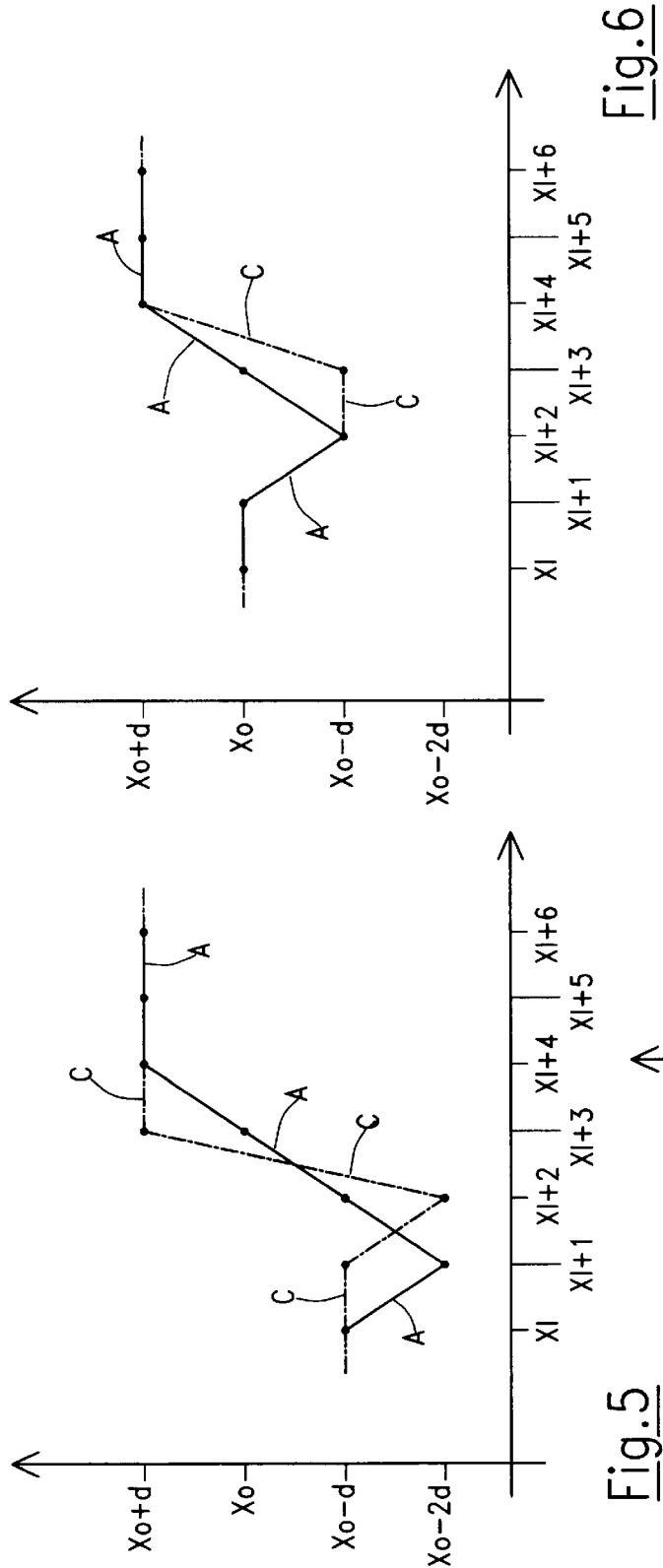
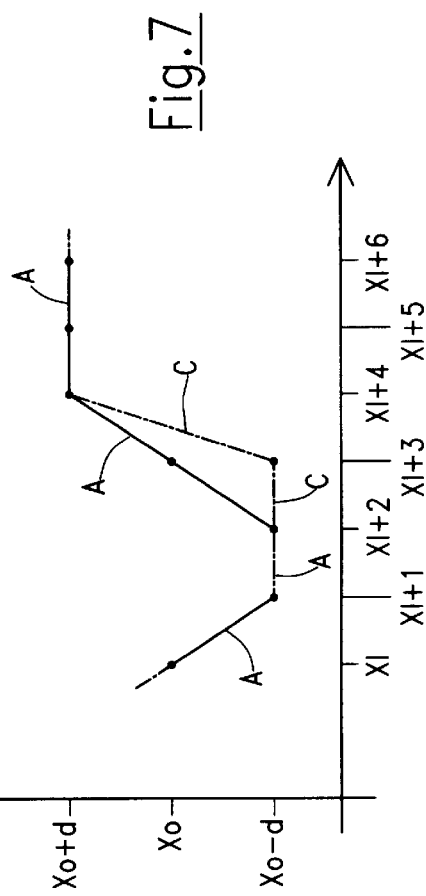
Fig.5
Fig.6
Fig.7

CIRCUIT FOR ENHANCING CHROMINANCE TRANSITIONS IN REAL-TIME VIDEO RECEPTION

TECHNICAL FIELD

The present invention relates to a circuit for enhancing chrominance transitions in real-time video reception.

BACKGROUND OF INVENTION

In current commercial TV transmission standards, the limited bandwidth of the transmitted chrominance (or chrominance difference) signals causes the received images to have perceptibly blurred color transition edges. This is especially evident if the received image contains geometrical patterns, e.g., test-color bars, and results in the loss of detail detectable in complex multicolored fine patterns.

In order to improve the quality of the received images, it is necessary to provide the receiver end with circuits capable of restoring, as far as possible, the frequency components in the chrominance signals which have been filtered away by the requirements of the reduced transmission bandwidth. In this way, the temporal duration of the chrominance transition edges, and thus the spatial extent of the chrominance transitions on the TV screen, can be reduced, and the edge definition improved. Circuits of this type are called "Color Transient Improvement" ("CTI") or Chrominance Transition Enhancement circuits.

An important constraint on chrominance transition enhancement circuits is the need to ensure that the center of the chrominance transition is unaffected by the enhancement process, so that the center of the chrominance transition after the enhancement process is still aligned with the center of the associated transition in the luminance signal. Also, it is necessary to leave gradual transitions in time unaltered; preserve, and possibly enhance, fine patterns; prevent the introduction in the image of additional distortions; and ensure that the existing noise components are not accentuated.

Most of the methods proposed over the past decade to enhance chrominance transitions make use of analog waveform shaping techniques, and do not satisfy most of the above-mentioned requirements.

SUMMARY OF THE INVENTION

In view of the state of the art described, it is an object of the present invention to provide a circuit for enhancing chrominance transition in a received video image which, differently from known circuits, satisfies all the above-mentioned requirements.

According to the present invention, such object is achieved by means of a circuit for enhancing chrominance transitions in a received chrominance video signal, characterized by comprising linear-phase digital filter means supplied with an input stream of discrete chromatic image elements and having a high-pass transfer characteristic in a region of the frequency spectrum corresponding to an upper limit of a transmitted chrominance signal bandwidth for enhancing high-frequency components of the received chrominance signal, and non-linear digital post-processing means supplied by an output of the filter means and by said input stream of discrete chromatic image elements, the non-linear post-processing means comprising first means acting on said output of the filter means for eliminating distortions introduced in the received chrominance signal by the filter means and second means for detecting if the received chrominance signal contain a transition pattern corresponding to predetermined patterns and for correspondingly forcing an output of the circuit to be equal to the received chrominance signal.

Preferably, the digital filter means comprise a Finite Impulse Response (FIR) digital filter.

FIR digital filters are characterized by having an impulse response of finite duration; in the present application, the duration of the impulse response should be chosen in such a way as noise configurations are not mistaken for high frequency signal components, and sampling errors in the received chrominance signals are not accentuated. A FIR filter of order seven, having an impulse response with duration of seven samples, is preferred.

The FIR digital filter of the chrominance transition enhancement circuit of the present invention has a symmetric impulse response. In this way, the transfer function has a linear phase characteristic, thus keeping the center of the enhanced chrominance transition aligned with the associated transition in the luminance signal.

The non-linear post-processing means not only eliminates artificial distortions that could be introduced in the received chrominance signal by the digital filtering, but also inhibits the filtering process from being performed when the chrominance transition contains an ambiguous pattern which, for example, corresponds to the presence of noise or sampling errors, to prevent that said noise or errors are accentuated by the digital filter action.

BRIEF DESCRIPTION OF THE DRAWINGS

These and other features and advantages of the present invention will be made more evident by the following detailed description of a particular embodiment thereof, illustrated in the annexed drawings.

FIG. 5 shows an example of chrominance transition that is enhanced by the circuit of the invention;

FIGS. 6 and 7 show two examples of chrominance transitions, respectively a noise configuration and an ambiguous transition, that are not enhanced by the circuit of the invention.

DETAILED DESCRIPTION OF THE INVENTION

Figure 1:
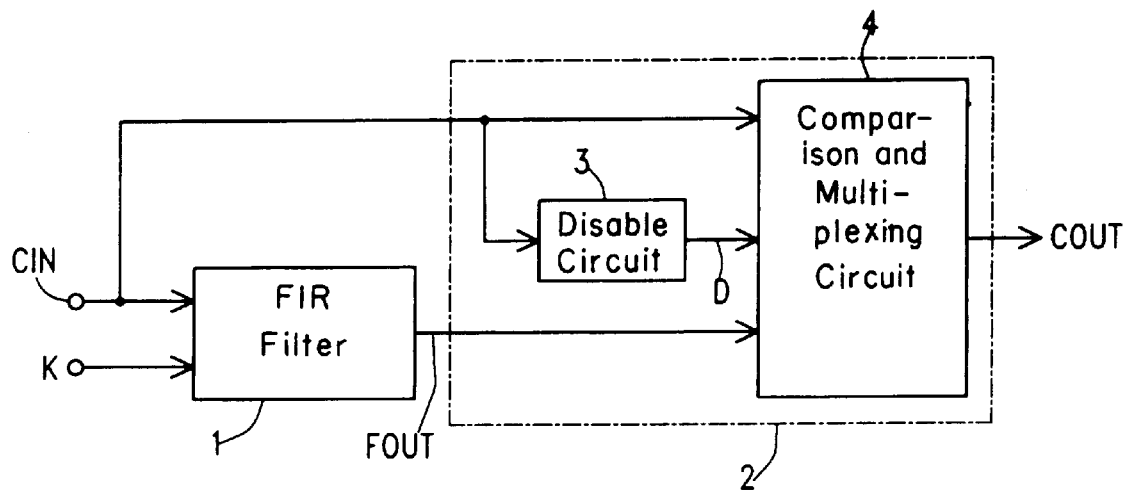
FIG. 1 is a schematic block diagram of a circuit according to the present invention.

With reference to FIG. 1, a circuit for enhancing chrominance transition according to the present invention is schematically shown. The circuit comprises a Finite Impulse Response (FIR) digital filter 1 supplied with a chrominance signal CIN. Signal CIN is, for example, one of the two chrominance-difference signals CB and CR (or U and V) which are transmitted by the video signal transmitter together with the luminance signal.

Signal CIN is intended to be a digital signal, i.e., a discrete stream of quantized samples each one representing, conventionally by means of an eight-bit code corresponding to 256 different levels, the chrominance information of a respective picture element (pixel) of the image. In conventional analog TV broadcasting, wherein the transmitted luminance and chrominance signals are analog waveforms, the luminance and chrominance signals are digitally converted at the receiver end. In conventional digital TV broadcasting, the luminance and chrominance signals are instead directly transmitted in digital form.

Additionally, if the known 4:2:2 sampling scheme is used for the luminance and chrominance signals (two samples for each one of the chrominance-difference signals CR, CB every four samples of the luminance signal), signal CIN can be a multiplexed stream of the two chrominance-difference signals CB, CR. In this way, if the chrominance transition enhancement circuit operates at the sampling frequency of the luminance signal, it is not necessary to have two distinct enhancement circuits for the two chrominance-difference signals, thus reducing the hardware requirements. However, it is possible to operate on the two chrominance-difference signals individually by providing two distinct enhancement circuits identical to each other.

Filter 1 is used to enhance high frequency components in the chrominance signals along the horizontal direction of the received images. Toward this end, the transfer function of filter 1 has a high-pass characteristic near the upper limit of the known chrominance bandwidth interval, so that the high frequency components of the chrominance signals are enhanced, while the low frequency components are attenuated. Filter 1 is also designed to have a linear phase transfer function, so that the centers of the known chrominance transitions after filtering are not shifted in time with respect to the corresponding transitions in the luminance signal.

Filter 1 also includes a gain-control circuit for controlling the gain of filter 1 according to the value of a user-programmable parameter K.

The circuit also comprises a non-linear post-processing circuit 2, the inputs to which are the gain-controlled output FOUT of filter 1 and the input chrominance signal CIN. The post-processing circuit 2 comprises a disabling circuit 3 supplied by the received chrominance signal CIN and controlling the activation of a disable signal D. Circuit 3 analyzes the received chrominance signal CIN to detect if the received pattern corresponds to particular chrominance transition patterns for which transition enhancement is to be avoided so as not to accentuate noise, as will be better explained later on. Signal D is activated when the received pattern corresponds to one of said particular chrominance transition patterns.

Signal D is supplied, together with the received chrominance signal CIN and the output FOUT of filter 1, to a comparison and multiplexing circuit 4. Circuit 4 processes the filter output FOUT to remove artifacts introduced by the filtering process. If the disable signal D is deactivated, the output of circuit 4, which forms the enhanced chrominance signal COUT, is equal to the processed output FOUT of filter 1. Conversely, when signal D is activated (i.e., the received chrominance transition pattern corresponds to one of the above-mentioned particular patterns), the output COUT is made equal to the received chrominance signal CIN.

Figure 2:
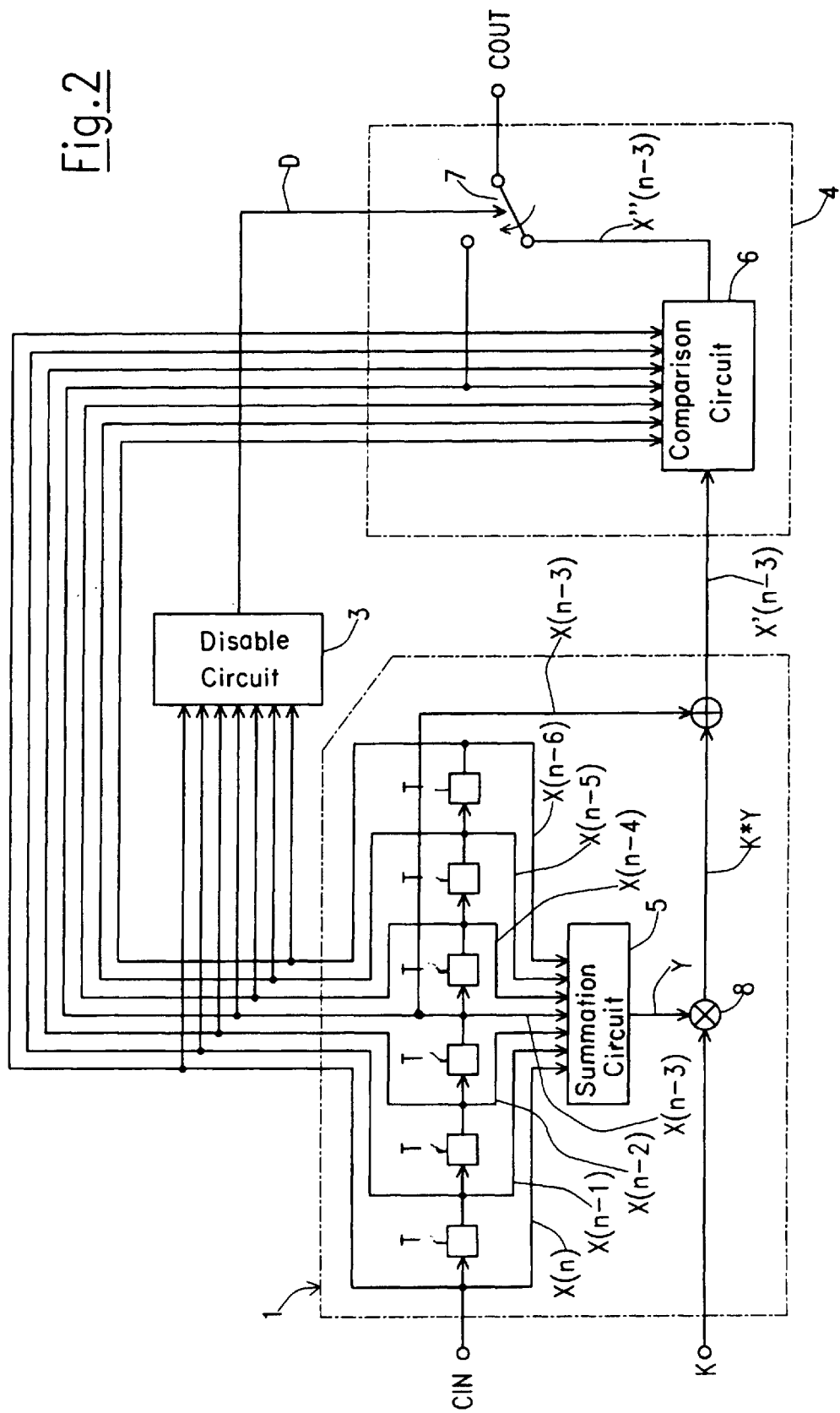
FIG. 2 is a schematic block diagram of a practical embodiment of the circuit of FIG. 1.

FIG. 2 shows in greater detail, although schematically, the structure of the circuit of FIG. 1, in a preferred embodiment. Filter 1 is a digital, Finite Impulse Response (FIR) filter of order seven. As known, FIR filters are characterized by an impulse response having a finite duration of N samples; the impulse response of an FIR filter of order seven has a duration of seven samples, namely the current chrominance sample x(n) and the six preceding samples x(n−1) . . . x(n−6).

The filter 1 contains a delay line with six delay elements T, providing the current sample x(n) and the six previous samples x(n−1) . . . x(n−6). The current sample x(n) and the six preceding samples x(n−1) . . . x(n−6) form a so-called processing window, i.e., a sub-set of pixels of an image line. The central pixel of the processing window represents the current pixel whose associated chrominance sample x(n−3) is to be enhanced. The processing window shifts horizontally along the direction of the image line one pixel at a time.

The samples x(n) . . . x(n−6) of the processing window are supplied to a weighted summation circuit block 5 having an output Y equal to:

Y=h(0)*x(n)+h(1)*x(n−1)+ . . . +h(6)*x(n−6), where h(i) (i=0 . . . 6) are the values of the impulse response of the FIR filter 1 for the samples x(n−i). Advantageously:

$h(i)=-1$ for $i=0,1,2,4,5,6$ $h(3)=6$ so that the output of filter 1 is:

$Y=-x(n-6)-x(n-5)-x(n-4)+6*x(n-3)-x(n-2)-x(n-1)-x(n)$.

Filter 1 is symmetric with respect to the central pixel of the processing window x(n−3). In this way, the transfer function of filter 1 has a linear phase characteristic: this assures that the center of a chrominance transition remains unaltered after the enhancement process (i.e., the chrominance transition center is not shifted in time with respect to center of transition in the associated luminance signal), and the gradual transitions in hue are not made abrupt.

In the practical implementation, filter 1 can be realized by means of a tree of adders, interspersing subtractions and additions, so that finite word length effects are minimized. All multiplications can be effected by means of conventional signed-digit technique. Of course, one of skill in the art will realize that there are other ways of physically implementing the filter 1.

Filter 1 comprises a gain-control mechanism (represented schematically by a multiplier 8). The output signal Y of circuit 5 is multiplied by the user-programmable parameter K (gain reduction factor) with value comprised between 0 and 1; preferably, the value of K is discretely variable among four different values K1, K2, K3, K4. This achieves a user-controlled degree of enhancement of the chrominance transition, according to the user preference.

Then, sample x(n−3) (i.e., the central pixel of the processing window) is added to signal K*Y, to obtain:

x'(n−3)=x(n−3)+K*Y. x'(n−3) represents the filtered value of the chrominance signal of the central pixel of the processing window.

Figure 3:
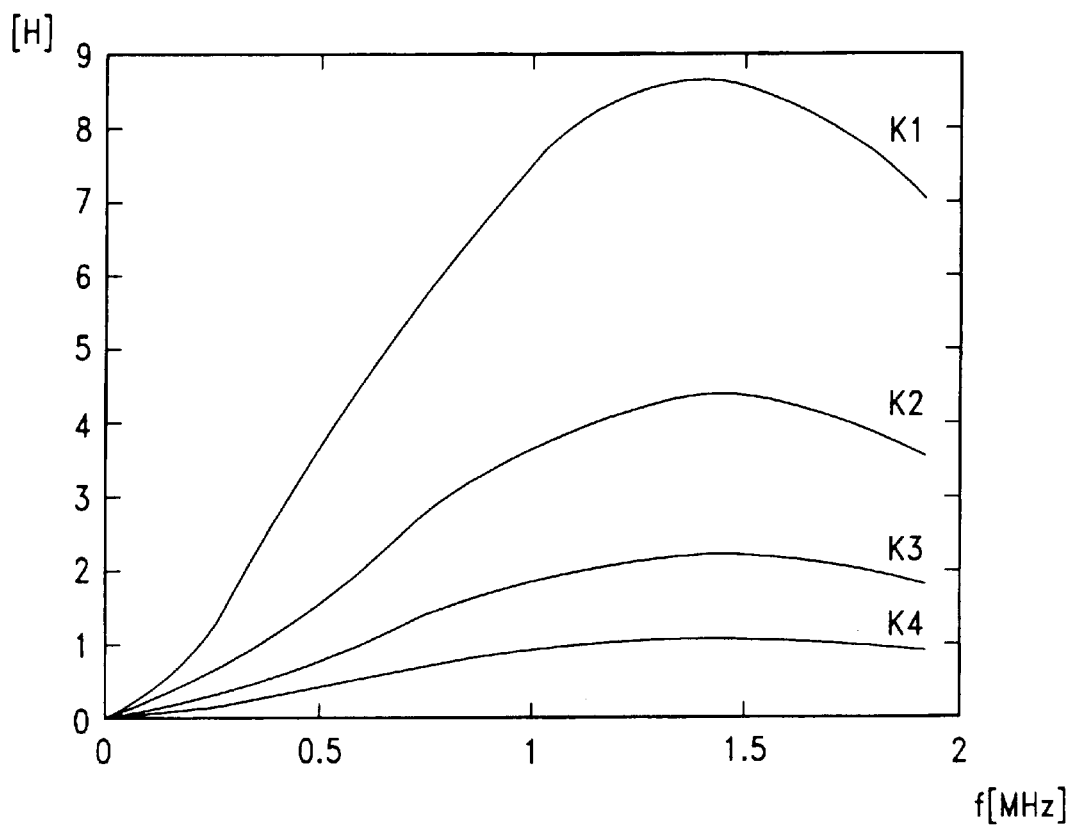
FIG. 3 is a diagram of a transfer function of a digital filter of the circuit of FIG. 2, for different values of a user-programmable parameter.

Assuming that filter 1 has an impulse response h(i) with the values previously indicated, the frequency response of filter 1 is that shown in FIG. 3. Assuming that the sampling frequency of the color-difference signals is 6.75 MHz, a 4:2:2 video format transmission is used, and the luminance signal is sampled at 13.5 MHz, it appears that the frequency response of the filter is centered in the region of the chrominance bandwidth, with a peak around approximately 1 MHz. The filter thus has a substantially high-pass characteristic in the region of interest of the chrominance signal frequency spectrum.

The use of a processing window with length of seven samples (that is, the use of a FIR filter of order seven) assures that noise configuration are not mistaken for high frequency signal components, as would be the case if the impulse response were shorter. Furthermore, a shorter impulse response having a pass-band characteristic in the region of interest of the frequency spectrum could lead to peaking of sampling errors, e.g., a large change in the values of the picture elements followed by a small change (in the same direction) in the body of a transition. This would generate additional noise rather than detect real chrominance edges, generated by transitions in color. Finally, an impulse response of limited duration could fail to adequately emphasize edges in the presence of pre-existing noise.

Figure 4:
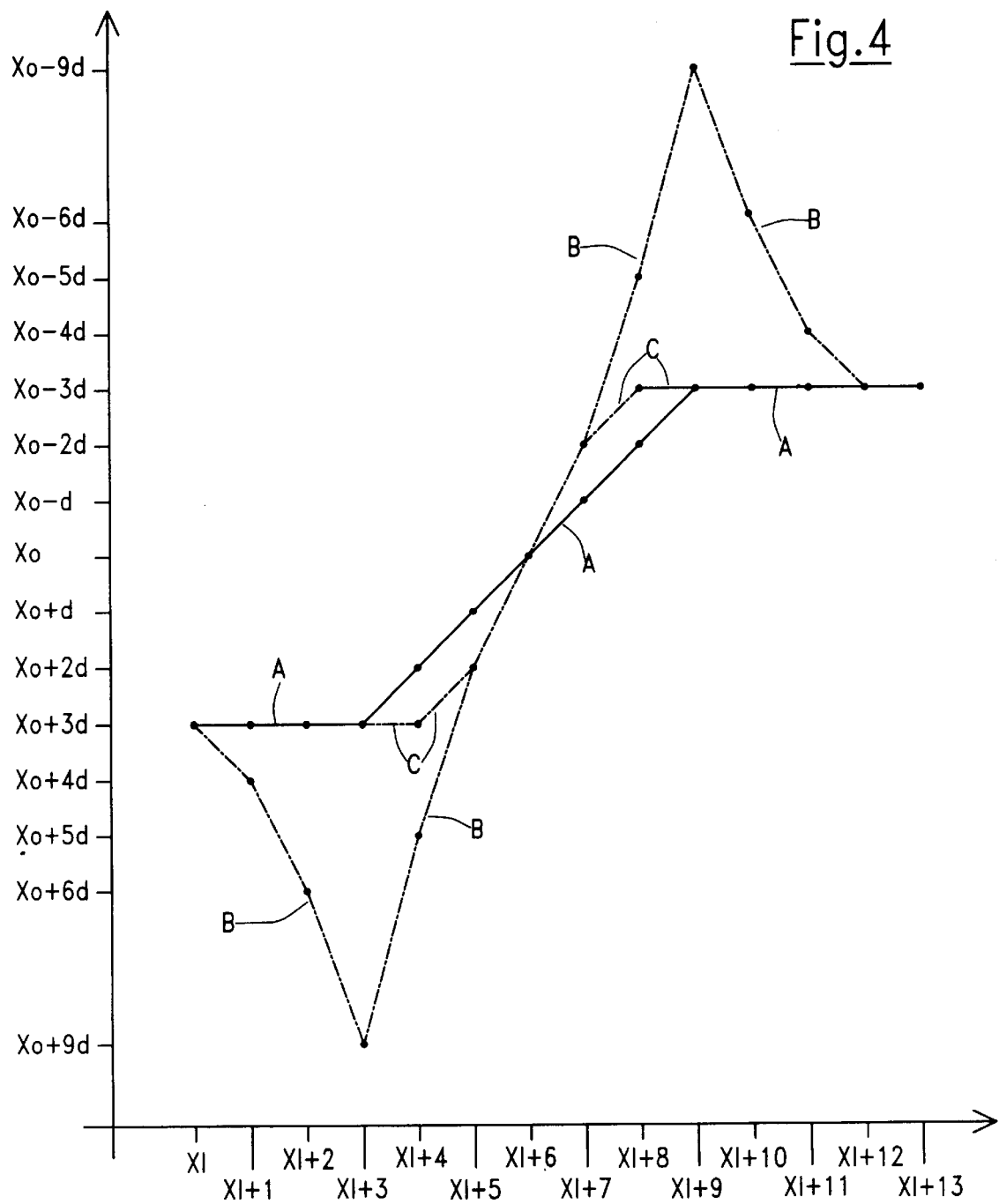
FIG. 4 shows a chrominance transition before and after the enhancement operated by the circuit of FIG. 2.

The result of the filtering action on an input sequence is depicted in FIG. 4 in the example of an increasing chrominance transition. In the drawing, x1 . . . x1+13 represent the chrominance samples associated to a sub-set of pixels of a given line of the image. The chrominance transition starts at pixel x1+3 and ends at pixel x1+9, and has a constant gradient. Curve A represents the received chrominance signal CIN, d is the uniform rate of increase of the chrominance signal value at the sampling rate, and x0 is the value of the pixel x1+6 at the center of the transition. Curve B represents the filtered value of the input sequence (i.e., the filter output signal FOUT) under the assumptions, made by way of example only, that the pixels preceding x1 and the pixels following x1+13 are respectively equal to x1 and x1+13. Here, the user-programmable parameter K is supposed to equal to 1. It appears that the gradient of the received chrominance transition has effectively been made steeper and the spatial extent of the chrominance transition has been reduced, but undesired undershoots and overshoots have been introduced by filter 1 at the beginning and at the end of the transition (pixels x1+1 to x1+4 and x1+8 to x1+11).

In order to ensure edge sharpening without introducing undesired artifacts in the processed chrominance signal, such as the above-mentioned overshoots and undershoots, the output FOUT of filter 1 is supplied to the comparison and multiplexing circuit 4. The latter comprises a comparison circuit 6 (FIG. 2) supplied with the chrominance signal samples x(n) . . . x(n−6) of the pixels in the processing window. Circuit 6 has an output x"(n−3) which has a value constrained to values limited by the values of the immediate neighboring picture elements of the central picture element x(n−3) of the processing window. In this way, if the result x'(n−3) of the filtering process exceeds the greatest value of its neighboring picture elements of the processing window, the output x"(n−3) is forced to be equal to the greatest value of the neighboring pixel. Likewise, if the result x'(n−3) of the filtering process is less than the smallest value of the neighboring pixels of the processing window, the output x"(n−3) is forced to be equal to the smallest value of the neighboring pixels of the processing window.

The input chrominance signal can contain particular ambiguous patterns for which enhancement processing could emphasize undesired effects. FIGS. 5, 6 and 7 show three particular patterns of transition of the chrominance signal which will be now discussed. In FIG. 5, curve A exemplifies the case of a signal wherein the peak amplitude need not be modified, but the slope of the transition could notwithstanding be increased. It is possible to see that the processed chrominance signal at the output of circuit 6 (curve C) preserves the characteristic of the input chrominance signal, and at the same time the gradient of the chrominance transition is enhanced. FIGS. 6 and 7 exemplify instead two ambiguous patterns: the pattern of curve A in FIG. 6 corresponds for example to a noise pulse, while the pattern of curve A in FIG. 7 could correspond to a fine detail in the image or to a sampling error of the chrominance signal. In both cases, the processed chrominance signal at the output of circuit 6 (curves C) enhance the ambiguous pattern: the impulsive noise is accentuated at the cost of the actual transition that follows. In situations like these the filtering process should be inhibited, to avoid possible further deterioration of the received signal. This is done by means of the disabling circuit 3 (FIG. 2) which compares the received pattern of the chrominance signal with predefined ambiguous patterns which should not be emphasized. Circuit 3, through its output signal D, controls multiplexer 7 to connect the output COUT of the enhancement circuit to the output x"(n−3) of circuit 6 when signal D is disactivated, and to the central pixel x(n−3) of the processing window as originally received when signal D is activated.

According to a preferred technique, circuit 3 computes the first derivatives of the samples contained in the processing window, and compares said first derivatives with a threshold value E (threshold first derivative) corresponding to the minimum difference between the chrominance values of two successive pixels that causes a visually perceptible change in color (typically, in a 256-level scale of values, four levels). Six first derivatives are first computed, namely:

$f'(k)=x(n)-x(n-k)$ with k=1,2, . . . ,6; according to the value of each one of the six first derivatives with respect to the threshold value E, a variable s(k) associated with each first derivative is made equal to:

$s(k)=1$ if $f'(k) \geq E$;

$s(k)=-1$ if $f'(k) \leq -E$;

and $s(k)=0$ if $|f'(k)|$ is less than $E$.

The output signal D of circuit 3 is activated (to inhibit the filtering action and thus to connect the output COUT of the enhancing circuit to x(n−3)) if:

$s(k-p)=-s(k-q)=0$ for $p,q=1,2,3,4$;

s(k−p)=−s(k−p−2); s(k−p−1)=0 for p=0,3 i.e., if first derivatives of opposite signs occur among the five central pixels x(n−5) . . . x(n−1) of the processing window, or if a configuration of the type shown in FIG. 7, curve A is encountered, with the peripheral pixels at either end of the processing window.

According to these considerations, the output COUT of the circuit can be expressed in the following way:

if min $[x(n-2),x(n-4)] \leq x'(n-3) \leq$ max $[x(n-2),x(n-4)]$ AND NOT (D) COUT=x'(n−3)=x(n−3)+K*y;

if $x'(n-3) \leq$ min $[x(n-2),x(n-4)]$ AND NOT (D) COUT=min $[x(n-2),x(n-4)]$;

if $x'(n-3) \geq$ max $[x(n-2),x(n-4)]$ AND NOT (D) COUT=max $[x(n-2),x(n-4)]$;

else

COUT=x(n−3).

When the above-mentioned algorithm is applied to the output of filter 1 represented by curve B in FIG. 4, the result shown in curve C of FIG. 4 is obtained. It appears that the gradient of the chrominance transition has again been made steeper than that of the received chrominance signal, but the artificial undershoots and overshoots introduced by the filtering process have been eliminated. It is also possible to see that $(x1+6)"=x_0$, i.e., the center of the chrominance transition is unaltered, and continues to remain aligned with the center of the corresponding transitions in the luminance signal (as well as with the center of the associated transitions in the other chrominance signal).

In the enhancement circuit of the present invention, slow chrominance transitions (i.e., transitions significantly longer than the processing window of the linear-phase FIR filter) corresponding to gradual changes in hue, are essentially left unaltered. Only a relatively insignificant crispening effect is introduced, at the beginning and at the end of such transitions. The longer the duration of a transition, the less pronounced is this crispening effect.

While the present invention has been described with the reference to a preferred embodiment thereof, those skilled in the art will appreciate various changes in form and detail may be made without departing from the intended scope of the present invention as defined in the appended claims.

What is claimed is:

1. A circuit for enhancing chrominance transitions in a received chrominance video signal, comprising:

linear-phase digital filter means supplied with an input stream of discrete chromatic image elements and having a high-pass transfer characteristic in a region of the frequency spectrum corresponding to an upper limit of a transmitted chrominance signal bandwidth for enhancing high-frequency components of the received chrominance signal;

non-linear digital post-processing means supplied by an output of the filter means and by said input stream of discrete chromatic image elements, the non-linear post-processing means comprising first means acting on said output of the filter means for eliminating distortions introduced in the received chrominance signal by the filter means and second means for detecting if the received chrominance signal contains a transition pattern corresponding to predetermined patterns and for correspondingly forcing an output of the circuit to be equal to the received chrominance signal.

2. The circuit according to claim 1 wherein said digital filter means comprise gain control means supplied by a gain-reduction signal for controlling a gain of the transfer function of the digital filter means.

3. The circuit according to claim 1 wherein said digital filter means comprises a finite impulse response digital filter having a symmetric impulse response of finite duration.

4. The circuit according to claim 1 wherein said digital filter means comprise a finite impulse response digital filter of the seventh order.

5. The circuit according to claim 1 wherein said digital filter means comprise summation means for adding a value of a received chromatic picture element currently processed to a weighted sum of the currently processed chromatic picture element and of six neighboring chromatic picture elements, each chromatic picture element being weighted by the impulse response of the digital filter means.

6. The circuit according to claim 5 wherein the impulse response of said filter is described by the vector of coefficients (−1, −1, −1, 6, −1, −1, −1).

7. The circuit according to claim 5 wherein said weighted sum is multiplied by said gain-reduction signal.

8. The circuit according to claim 5, wherein said first means comprises third means for comparing the output of the digital filter means with said neighboring chromatic picture elements for detecting if the output of the digital filter means has a value higher or lower than the greater or the lower, respectively, neighboring chromatic picture element, and for correspondingly forcing the output of the digital filter means to be equal to the greater or the lower neighboring chromatic picture element, respectively.

9. The circuit according to claim 8, wherein said first means comprises multiplexing means for selectively coupling the output of the circuit to an output of said third means or to the corresponding currently-processed received chromatic picture element.

10. A method for enhancing chrominance transitions in a received chrominance video signal, comprising the steps of:

submitting a discrete stream of chromatic picture elements of the received chrominance signal to a linear-phase high-pass digital filtering to provide a filtered discrete signal containing enhanced high-frequency components of the received chrominance signal;

non-linearly processing the filtered discrete signal for eliminating distortions introduced by the high-pass digital filtering;

detecting if the received chrominance signal contains a transition pattern corresponding to prescribed patterns which are not to be high-pass filtered;

providing an enhanced output signal which if the received chrominance signal contains a pattern corresponding to said prescribed patterns is equal to the received chrominance signal, otherwise the enhanced signal is equal to the non-linearly processed high-pass filtered signal.

11. A digital video chrominance enhancing circuit comprising:

a digital finite impulse response filter for sequentially receiving digital chrominance values and providing a filtered chrominance signal to a filter output;

a detection circuit for concurrently receiving the digital chrominance values and providing, to a detection output, a detection signal indicating whether a combination of the digital chrominance values match one of a plurality of stored patterns of values; and a comparison circuit for concurrently receiving the digital chrominance values and for receiving the filtered chrominance signal and the detection signal, and for providing to a circuit output, based on the state of the detection signal, the filtered chrominance signal or one of the digital chrominance values.

12. The enhancing circuit of claim 11 wherein the digital finite impulse response filter is a seventh order filter.

13. The enhancing circuit of claim 12 wherein the digital finite impulse response filter further comprises six sequential delay circuits that concurrently provide the digital chrominance values to the detection and comparison circuits.

14. The enhancing circuit of claim 11 wherein the one of the digital chrominance values provided to the circuit output is centermost with respect to the other digital chrominance values.

15. The enhancing circuit of claim 11 wherein the digital chrominance values are summed, using a weighted summing technique, into the filtered chrominance signal.

16. The enhancing circuit of claim 15 wherein the digital chrominance values include a present value and six next-most previously present values.

17. The enhancing circuit of claim 16 wherein the weighting of the digital chrominance values is weighted by a vector of (−1, −1, −1, 6, −1, −1, −1) as applied to the present value and six most previously present values.

18. The enhancing circuit of claim 16, further comprising a limiting circuit for comparing the third-most previously present digital chrominance value to the second and fourth-most previously present values and limiting the amount the third value can be rectified to the levels of the second and fourth values.

19. The enhancing circuit of claim 11, further comprising a gain control circuit for accepting a gain limiting value and providing to the filter output the filtered chrominance signal multiplied by the gain limiting value.

20. The enhancing circuit of claim 19 wherein the gain limiting value is a real number between 0 and 1.

21. The enhancing circuit of claim 19 wherein the gain limiting value is chosen from four preselected values.

22. A method for enhancing digital video chrominance values comprising the steps of:

receiving a plurality of sequential digital video chrominance values;

filtering the digital video chrominance values to a weighted average based on a position of a present value in the sequence of digital video chrominance values;

comparing the digital video chrominance values to a plurality of stored values;

generating a disable signal if the digital video chrominance values match one of the stored values;

selecting one of the digital video chrominance values for a filter output if the disable signal is in one state; and selecting the filtered digital video chrominance value for the filter output if the disable signal is in another state.

23. The method of claim 22, further comprising the step of:

accepting an attenuation value; and reducing the rectified digital video chrominance signal by the attenuation value.

24. The method of claim 23 wherein the attenuation value is a real number between 0 and 1.

25. The method of claim 23 wherein the attenuation value is one of four preselected values.

26. The method of claim 22 wherein the predetermined stored values represent noise patterns in the digital video chrominance values.

* * * * *